AIR LUBRICATED MAGNETIC HEAD PAD AND MOUNTING SYSTEM THEREFOR

Filed Dec. 28, 1964

INVENTORS
GEOFFREY N. TAYLOR
LEONARD S. BLEININGER
BY Samuel Lindenberg
Arthur Friedrich
ATTORNEYS United States Patent Office 3,430,006

Patented Feb. 25, 1969

3,430,006

AIR LUBRICATED MAGNETIC HEAD PAD AND MOUNTING SYSTEM THEREFOR

Geoffrey N. Taylor, Santa Monica, and Leonard S. Bleininger, Northridge, Calif., assignors to Data Products Corporation, Culver City, Calif., a corporation of Delaware Filed Dec. 28, 1964, Ser. No. 421,542

U.S. Cl. 179—100.2 13 Claims

Int. Cl. G11b 5/40

ABSTRACT OF THE DISCLOSURE

A system for mounting a magnetic head pad for use in a disc memory system. The mounting system includes a bellows secured between a support arm and the pad. The bellows permits torsional freedom about first and second orthogonal axes respectively extending in a plane parallel to the disc surface. The bellows exhibits torsional rigidity about a third orthogonal axis extending perpendicular to the disc surface. Translation between the support arm and pad is prevented by a locating pin extending therebetween coincident with the bellows axis. The pad is comprised of a main pad portion and trailing boom carrying the head so as to position the head close to the disc surface.

This invention relates generally to apparatus finding significant utility in moving medium recording systems.

Magnetic disc storage systems are finding increasing usage in digital data processing systems as mass memories. Essentially, all known disc storage systems are comprised of a plurality of discs stacked on a common axis. Drive means are provided for rotating the entire disc stack at a uniform rate about the common axis. Usually, both surfaces of each disc are coated with a magnetic recording material and information is adapted to be stored in annular tracks defined coaxially on each surface. Oftentimes, over 100 tracks are defined on each disc surface and because, for most applications, it is usually too expensive to provide a different read/write head for each track, a lesser number of heads, as few as one, are provided per disc surface with means also being provided for moving the head to a position adjacent to a selected track.

More particularly, it is common practice to space the discs sufficiently so as to permit a read/write head adjacent each surface to move along the disc radius to a selected track. Usually, the heads are carried by pads suspended from support arms which are connected together to form some type of comb arrangement which can be projected a desired distance into the stack.

In order to achieve high recording densities while still maintaining adequate bit resolution and signal level, it is desirable to maintain the spacing between each head and the corresponding disc surface as small as possible. To do this, it has become common practice to use a so-called "flying head" in which each pad is supported above the disc surface by an air bearing when the relative speed between the pad and the disc exceeds a certain amount. Use of this flying principle facilitates movement of the pad over surface imperfections which almost always exist on the disc.

From what has been said thus far, it should be apparent that there can be relative movement between the pad and disc in two perpendicular directions, i.e., along an axis parallel to a disc radius, when the pad is being moved to a selected track, and along an axis parallel to a tangent to the disc as a consequence of the normal disc rotation. In order for the pad to ride over surface imperfections, it is necessary that a gimbal mounting system be provided which permits the pad a certain degree of torsional freedom around these two axes. On the other hand, in order to maintain alignment between the head and each track, it is desirable to avoid any translation between the pad and support arm and in addition to maintain a high degree of torsional rigidity therebetween about an axis extending parallel to the common stack axis. Various mounting systems have been employed in the prior art to impart this directional freedom and rigidity to a pad but for various reasons each such mounting system has left something to be desired. Thus, continuing efforts have been made to develop improved mounting systems for this application.

It is therefore an object of the present invention to provide a gimbal mounting system for supporting a pad such that it has relative torsional freedom about two perpendicular axes and torsional rigidity about a third. Although a gimbal system provided in accordance with the invention finds significant utility in conjunction with a disc recording system, it is specifically pointed out that such a gimbal system is equally as useful in any other environment where the indicated gimballing characteristics are desired.

Briefly, in accordance with a first aspect of the invention, a pad is secured to a bellows suspended from a support arm. A fixed length locating pin is provided which extends through the bellows and is terminally registered with points on the support arm and pad, there being a universal pivot defined at one of such points.

It has been pointed out that it is desirable in disc storage systems to space a read/write head as close to the corresponding disc surface as is possible. In order to do this, the head is usually carried at the trailing edge of an aerodynamically designed (i.e., having smooth surfaces and appropriate shape and dimensions) pad since the pad normally assumes an angle of attack with its leading edge spaced further from the disc surface than its trailing edge. Although this technique of mounting the head at the pad trailing edge permits it to be spaced at a certain minimum distance from the disc surface while still out of contact therewith, attempts to reduce this minimum distance to less than 100 microinches or so, utilizing practically dimensioned pads, have proved to be futile.

In view of this, it is an object of the present invention to provide a pad assembly suitable for carrying a magnetic read/write head which permits the head to be maintained closer to, and yet still out of contact with, a disc surface than heretofore known assemblies.

Briefly, in accordance with a further aspect of the present invention, a multistage pad is provided which, in a preferred embodiment, includes a main pad portion and a smaller boom extending from the trailing edge thereof. The main pad is aerodynamically designed with a relatively large slenderness ratio and in operation assumes an angle of attack relative to the disc which enables its trailing edge to be spaced on the order of 100 microinches or more from the disc surface. The leading edge of the boom is secured to or formed integral with the trailing edge of the main pad and thus will also be spaced on the order of 100 microinches from the disc surface. The slenderness ratio of the boom is considerably smaller than that of the main pad and thus the boom does not have a significant effect on the angle or flying height assumed by the main pad. The boom will however of course assume the same attack angle as the main pad meaning that its trailing edge, carrying the head, will be spaced considerably closer to the disc surface than the trailing edge of the main pad.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(*a*) is *a* diagrammatic illustration of the angle assumed by a pad assembly in accordance with the present invention and FIGURE 4(*b*) is a diagrammatic showing of an alternative pad assembly.

Figure 1:
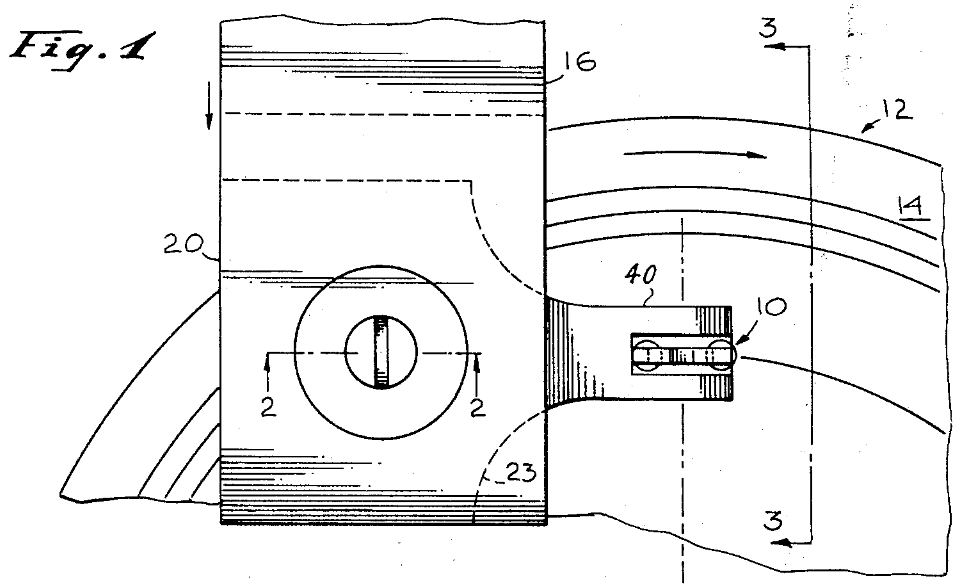
FIGURE 1 is a plan view of a portion of a disc storage system showing a magnetic head assembly in accordance with the invention.
Figure 2:
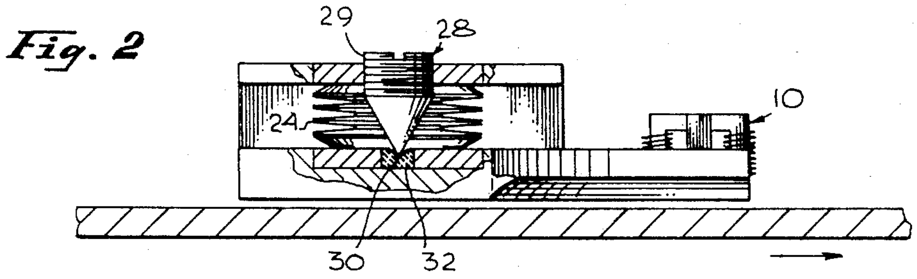
FIGURE 2 is a sectional view taken substantially along the plane 2—2 of FIGURE 1.
Figure 3:
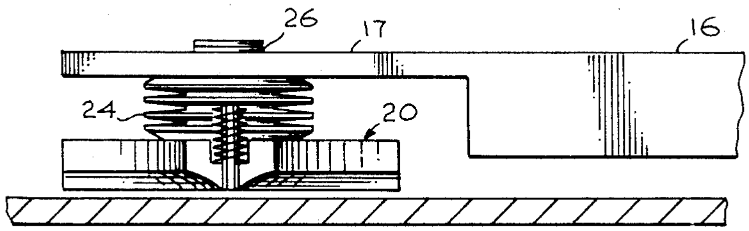
FIGURE 3 is a sectional view taken substantially along the plane 3—3 of FIGURE 1.

Attention is now called to FIGURE 1 which illustrates a preferred embodiment of the present invention in an assembly for supporting a read/write head 10. In one application of the invention, the head 10 is supported adjacent the surface of a disc having a recording medium, e.g., magnetic, thereon. A single disc 12 is illustrated in FIGURE 1 but it is pointed out that in most disc recording systems, a plurality of discs are provided in stacked relation for rotation about a common axis.

Both surfaces of the disc 12 are usually coated with a recording material which will henceforth be assumed to have magnetic characteristics. Information is usually stored in the recording material in concentric annular tracks 14. For economy reasons, many fewer heads are usually provided per disc surface than there are tracks. Thus, for example, a disc surface may have 100 tracks defined thereon and yet only one head may be provided for use with that surface. Consequently, means of course must be provided for positioning the head adjacent to a selected track. Usually, a positioning means for this purpose comprises a plurality of support arms 16 which are joined together adjacent one end thereof (not shown) to form what may be considered a comb assembly. A linear positioning means (not shown) is coupled to the comb assembly for projecting the support arms into the stack a desired distance.

Each support arm 16 is adapted to carry at least one head 10 under its reduced portion 17 at the free end thereof. It is of course desired to maintain the head as close as possible to the disc surface since bit resolution and reading signal level decrease rapidly as the spacing between the head and disc surface increases. However, although it is desired to maintain the head as close to the disc surface as possible, it is nevertheless usually also desired to maintain it out of contact therewith because in-contact recording usually introduces significant problems such as head wear, recording surface wear, etc. In order to maintain a head close to and yet out of contact with a moving a disc surface, it has become common practice to mount the head on an aerodynamically designed pad 20 which, when there is sufficient relative movement between the pad and the disc, effectively flies over the disc surface supported by an air bearing. In the presence of the air bearing, the pad assumes an angle of attack with its leading edge (FIGURE 4(*a*)) spaced a distance H1 from the disc surface and its trailing edge spaced by a smaller distance H2 from the disc surface. In the prior art, the head 10 is positioned at the trailing pad edge for the purpose of maintaining it as close to the disc surface as possible.

Although the surfaces of each disc are usually formed with considerable care to very close tolerances, imperfections in the disc surfaces are nevertheless often encountered. In order for the pad to be able to fly over such imperfections, it is necessary that it be mounted such that it has torsional freedom about an axis X parallel to a radius of the disc. In addition, since the support arms are moved along a radius to position the heads, it is additionally necessary that the pad be mounted so that it has torsional freedom about an axis Y extending parallel to a tangent to the disc. In addition to these two directions of torsional freedom or low torsional rigidity, it is on the other hand essential that the pad assembly be supported such that a high degree of torsional rigidity is present about an axis Z extending parallel to the stack axis to thus avoid any tendency of the pad to twist which would thereby disturb the alignment between the head 10 and the disc tracks. In addition to these torsional characteristics, it is generally desired to prevent any translation between the support arms and the pad assembly, so that the absolute position of the read/write gap may be accurately defined in space at all times.

The foregoing paragraph defines the operational requirements of a gimballing system for coupling a pad to a support arm. In addition to these requirements, it is also of considerable importance that the gimballing system be sufficiently small so as to be supportable, as a practical matter, under the support arm 16.

In accordance with the present invention, a hollow cylindrical bellows 24, preferably fabricated of metal, is provided. A first end surface of the bellows is rigidly secured to the underside of the support arm 16 coaxial with an internally threaded opening 26 defined in the reduced portion 17. The second end surface of the bellows 24 is rigidly secured to the upper surface of the pad 20. The end surfaces of the bellows 24 can be rigidly secured to the support arm 16 and pad 20 as by welding or by some alternative adhesive.

In order to prevent translation between the support arm 16 and pad 20, a fixed length locating pin is secured between points on the support arm and pad. In the preferred embodiment of the invention, the locating pin comprises a screw 28 having external threads 29 at the upper end thereof and a point 30 at the lower end thereof. The screw is secured to the support arm by having its threads 29 engaged in the internally threaded opening 26 in the support arm. The point 30 is received in a jewel bearing 32 defined in the upper surface of the pad 20.

As a consequence of the described construction, the point 3— precisely defines the pad pivot point, i.e., the origin of the two axes XY about which the pad has torsional freedom. The screw 28 defines the Z axis of the pad and the rigid securing of the bellows end surfaces to the support arm and pad impart torsional rigidity about this axis. In addition, the fact that the screw 28 is effectively secured between points in the support arm and pad, it prevents translation movement between the support arm and pad. However, not only does the screw 28 thus define the pad pivot point and prevent translation, but in addition it acts to transmit loads, both radial and axial, between the support arm and the pad which thus are necessarily applied through the pivot point. Coincidence of the load and pivot points and their close proximity to the pad center of gravity of course, substantially increases the stability of the pad.

In the operation of the apparatus thus far described, in order to avoid contact between the pad 20 and disc surface 12 during starting and stopping, means (not shown) are usually provided for retracting the support arm to thus lift the pad 20 away from the disc surface. Accordingly, since the bellows itself must support the weight of the pad in the absence of the air bearing, the screw 28 is normally adjusted so that the bellows 24 is in tension. Thus, the bellows 24 should maintain registration between the point 30 and bearing 32 even when the weight of the pad 20 tends to extend the bellows.

From the foregoing, it should be appreciated that a gimbal system has been provided herein which prevents translation between first and second members (i.e., the support arm and pad) but however provides relative torsional freedom about two axes while establishing torsional rigidity about a third. The screw 28 which functions to maintain a precise relationship between a precisely defined point on each of the members defines both the pivot and load points.

Although reasonably close spacing between a head and a disc surface can be established by mounting the head at the trailing edge of a conventionally designed pad which is supported by an air bearing, in accordance with a second feature of the invention, a multistage pad is provided which permits the head to fly even more closely to the disc than has heretofore been possible.

Prior art pad assemblies, as a rule, utilize a substantially rectangular pad having a length L and a breadth B where B/L is defined as the slenderness ratio. In order for pads to have the necessary operating stability, they are usually designed to have a slenderness ratio of approximately 1.0. The slenderness ratio is significant inasmuch as it relates the area of the pad upon which the air bearing can exert a lift force to the length of the pad which must be kept below a certain maximum for a specific pad area if the pad is to be at all times kept out of contact with the disc surface. It has been experimentally found that in order to maintain pad stability, it is virtually impossible to reduce the distance H2 between the trailing pad edge and the disc surface below 100 microinches with the repeatable reliability necessary for a production item. It can be shown that for a pad of given dimensions and a fixed load point, the value of $H1/H2$ remains constant so long as a certain relative velocity between the pad and disc surface is exceeded, regardless of limited relative velocity changes and variations in applied load amplitude.

In accordance with the present invention, in lieu of utilizing a single stage rectangular pad as taught in the prior art, a multistage pad is provided which comprises a substantially rectangular pad 20 and a much smaller trailing boom 40. Whereas the slenderness ratio of the pad 20 should be on the order of 1.0 as is conventional, the slenderness ratio of the boom 40 is much smaller, perhaps on the order of .025. Because of the disparity in slenderness ratios between the pad 20 and boom 40, the boom has a very small affect upon the pad whose attitude and flying height is governed substantially solely by its own characteristics. Since the leading edge of the boom 40 will therefore be supported at a distance H2 above the disc surface, and at an angle of attack given by $$\frac{\sin^{-1}(H1-H2)}{L1}$$

the trailing boom edge will be supported a distance H3 above the disc surface which of course is considerably smaller than the distance H2 for the normal attack angle. In view of the following relationship:

$$\frac{H1-H2}{L1}=\frac{H2-H3}{L2}$$

the necessary length L2 to provide a desired gap distance H3, can be determined within practical limits.

Thus, it should be appreciated that by providing a multistage pad with a trailing boom portion which contributes no significant lift effect in relation to the lift on the pad 20, a head can be spaced considerably closer to a disc surface than has heretofore been possible. The exact construction of a multistage pad in accordance with the invention can take several forms. That is, the boom 40 can be integrally formed with the pad 20 as shown, or can merely be secured thereto. However, in order to minimize air turbulence and assure flying stability, it is preferable that any pad construction have smooth rounded surfaces as indicated at 23.

Figure 4:
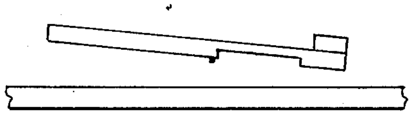
Figure 4:
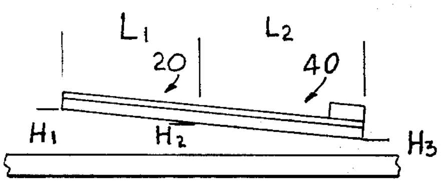

Although the disparities between the slenderness ratios of the pad and boom have been shown to be sufficient to space the head 10 sufficiently close to the surface of the disc 12, any lift on the boom 40 can still be further reduced by relieving or cutting out the undersurface thereof as shown in FIGURE 4(*b*).

From the foregoing, it should be appreciated that an improved gimballing system has been shown herein which is exceedingly useful for mounting a pad supported on an air bearing, as for example in disc storage systems. In addition, an improved pad construction has been disclosed for spacing a head closer to a recording surface than has heretofore been possible by utilizing a multistage pad in which the support of an air bearing is exerted substantially solely on a main pad portion and wherein the head carrying boom secured to the main pad portion has substantially no relative lift effect. It is pointed out that although primary consideration has been paid herein to an *air* bearing, the principles of the invention are of course equally as applicable with respect to any fluid.

We claim:

1. A gimbal assembly for supporting a pad from a support arm, said assembly comprising a bellows having first and second end surfaces;
means rigidly securing said bellows first end surface to said support arm and said bellows second end surface to said pad; and
means for preventing relative translation between said bellows first and second end surfaces along the axis of said bellows while permitting torsional freedom about first and second orthogonal axes each extending orthogonal to said bellows axis.

2. The assembly of claim 1 wherein said means for preventing translation includes a pin having first and second ends extending through said bellows; and means rigidly securing said first pin end to said support arm and pivotably securing said second pin end to said pad.

3. The apparatus of claim 1 wherein said means for preventing translation includes a bearing seat defined in said second end surface substantially coincident with said bellows axis;
a locating pin having first and second ends; and
means adjustably coupling said first pin end to said support arm for movement relative thereto along said bellows axis whereby said second pin end can be located in said bearing seat.

4. A magnetic disc storage system including a storage disc adapted to rotate about a disc axis extending perpendicularly through its center;
an arm supported for movement coincident with a radius of said disc;
a pad having first and second substantially parallel surfaces;
mounting means mounting said pad on said arm such that said pad has relative torsional freedom about first and second axes respectively extending coincident with a radius of said disc and parallel to a tangent to said disc and relative torsional rigidity about a third axis extending parallel to said disc axis; said mounting means including a bellows having first and second end surfaces;
means rigidly securing said first bellows end surface to said support arm and said second bellows end surface to said second pad surface; and
means for preventing relative translation between said bellows first and second end surfaces along said third axis.

5. The system of claim 4 wherein said bellows is hollow; said second pad surface defining a bearing seat therein; and a locating pin retained by an extending perpendicularly from said support arm extending through said bellows and terminally engaged in said bearing seat.

6. The system of claim 5 wherein said locating pin is adjustably retained on said support arm for movement in a direction parallel to said disc axis.

7. A magnetic disc storage system including a storage disc adapted to rotate about a disc axis extending perpendicularly through its center;
said storage disc having a recording surface thereon;
a support arm;
a pad having a leading and a trailing edge;
means mounting said pad on said arm such that said pad has relative torsional freedom about an axis coincident with a disc radius;

a boom having a leading and a trailing edge;

said boom secured to said pad with said leading boom edge coincident with said trailing pad edge;

a magnetic head; and means mounting said head on said boom adjacent the trailing edge thereof;

said pad being dimensioned so as to have a much larger breadth to length ratio than said boom;

said means mounting said pad including a bellows; and means rigidly securing a first end of said bellows to said support arm and a second end of said bellows to said pad.

8. The system of claim 7 wherein said bellows is hollow and said pad defines a bearing seat therein; and a locating pin retained by and extending perpendicularly from said support arm extending through said bellows and terminally engaged in said bearing seat.

9. The system of claim 8 wherein said locating pin is adjustably retained on said support arm for movement in direction parallel to said disc axis.

10. In a recording apparatus including a recording medium, a support arm mounted for movement relative to said medium, and a pad, means mounting said pad on said support arm for preventing translation of said pad relative to said support arm and for providing torsional freedom of said pad relative to said support arm about first and second substantially orthogonal axes and torsional rigidity of said pad relative to said support arm about a third axis substantially orthogonal to said first and second axes, said mounting means comprising:

a hollow bellows having first and second end surfaces;

means rigidly securing said bellows first and second end surfaces to said support arm and pad, respectively with the axis of said bellows coincident with said third axis; and means for preventing relative translation between said bellows first and second end surfaces along said third axis.

11. The system of claim 10 wherein a bearing seat is defined in said pad adjacent to said bellows second end surface and wherein a pin is secured to said support arm and engaged in said bearing seat.

12. The system of claim 10 wherein said pad has a leading and trailing edge; a boom having a width considerably smaller than that of said pad; said boom having a leading edge and a trailing edge; means joining said boom leading edge to said pad trailing edge; a head; and means securing said head to said boom adjacent the trailing edge thereof.

13. The system of claim 12 wherein said pad is supported in spaced relation to said recording medium by an air bearing created by relative movement between said pad and said recording medium; said air bearing creating a lift force on said pad and said boom proportional to the areas thereof.

References Cited

UNITED STATES PATENTS

| | | | |
|---|---|---|---|
| 3,162,164 | 12/1964 | Eck | 248—358 |
| 3,349,384 | 10/1967 | Kohn | 179—100.2 |
| 2,937,240 | 5/1960 | Harker | 179—100.2 |
| 3,197,751 | 7/1965 | Felts | 340—174.1 |
| 3,229,044 | 1/1966 | Kokke | 179—100.2 |

BERNARD KONICK, *Primary Examiner.*

J. R. GOUDEAU, *Assistant Examiner.*

U.S. Cl. X.R.

340—174.1